May 23, 1939.  W. R. GORHAM  2,159,695

INDUCTION MOTOR ROTOR

Filed Oct. 4, 1937

INVENTOR:
William R. Gorham
BY:
Glascock Downing & Seebold
ATTORNEYS.

Patented May 23, 1939

2,159,695

UNITED STATES PATENT OFFICE 2,159,695

INDUCTION MOTOR ROTOR

William R. Gorham, Shibuya-ku, Tokyo, Japan

Application October 4, 1937, Serial No. 167,298
In Japan November 21, 1936

3 Claims. (Cl. 172—120)

The present invention relates to induction motors of the type often referred to as squirrel-cage motors. More particularly the invention pertains to improvements in the construction of rotors for such motors and specifically relates to the shape and arrangement of the short-circuiting bars to provide improved cooling means and improvements in the tooth shape of the laminations.

An object of the present invention is to provide the rotor of an induction motor with a secondary winding wherein portions of the windings are so shaped and arranged as to provide improved means for creating forced ventilation of such motors.

Another object of the invention resides in the provision of short-circuiting bars of such cross-sectional shape as to function as fan blades for propelling air through the motor.

A further object of the invention is to provide a rotor structure having slots therein for receiving the secondary winding wherein the width of the tooth section of such slots will be uniform without weakening the root of each tooth.

Other and further features and objects of the invention will be more apparent to those skilled in the art upon a consideration of the accompanying drawing and the following description wherein an exemplary embodiment of the invention is disclosed.

Figure 1:
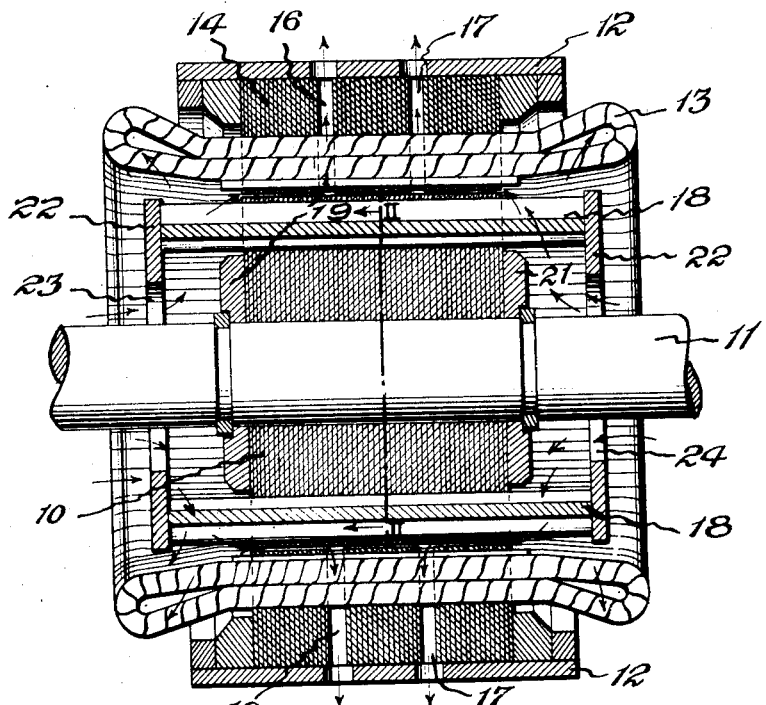
Figure 1 is a longitudinal section of an induction motor embodying the invention.

Referring to the drawing, there is shown in Fig. 1 a rotor formed of laminations 10 mounted on a shaft 11 in a manner well known to the art. The rotor carrying the novel secondary windings, the shape and arrangement of which is hereinafter described, is mounted for rotation within the stator 12. The stator carries windings 13 which are adapted to be connected to each other and to a source of alternating current so as to provide a primary field for the motor. The magnetic structure of the stator is preferably formed of laminations 14 spaced as indicated at 16 and 17 to provide slots or openings extending from the inner face of the field structure to the outer periphery of the stator. These openings are provided for the purpose of forming passages through which air is forced by the propelling means carried by the rotor.

The rotor laminations are slotted at circumferentially spaced intervals for receiving and supporting the secondary windings. The rotor windings comprise unique-shaped bars 18 as herein described which are positioned in the slots by insertion at the ends of the rotor. The bars 18 are formed of such length as to extend beyond the lateral faces 19 and 21 of the rotor. The bars 18 should be of substantially equal lengths so that a ring 22 may be connected to and supported by the bars terminating beyond each lateral face of the rotor. The bars 18 and the rings 22 are intended to provide a short-circuited or squirrel-cage secondary winding and these members are preferably formed from metal having the characteristics of being a good conductor of electrical currents and at the same time possessing relatively rigid mechanical properties, such as copper. The mechanical connections of the rings 22 to the bars 18 in addition to being secure should also be good electrical connections to provide the secondary windings with a relatively low resistance characteristic. Accordingly the rings 22 may be welded or otherwise suitably secured to the respective ends of the bars 18.

The rings 22 encircle each end of the shaft 11 to provide annular shaped openings 23 and 24 at the ends of the rotor. These openings provide entrance passages for the ventilating air as more fully set forth below.

Figure 2:
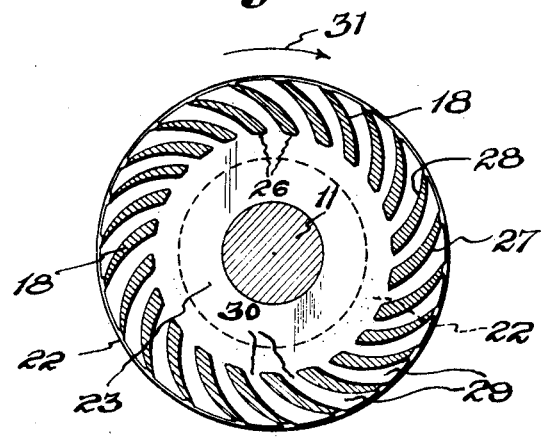
Fig. 2 is a sectional view of the rotor taken in the direction of the arrows associated with the line II—II of Fig. 1.

Referring more particularly to Figure 2 of the drawing it is to be noted that the cross-section of the slots while extending in a general radial direction nevertheless slant with respect to the true radii. In addition to such angular displacement the walls of the slots are also formed in a curved fashion. The bottom 26 of the slots is formed relatively wide as viewed in cross-section and the curved walls 27 and 28 are so shaped as to converge towards each other as the top of each slot is approached. The bars 18 are of such cross-sectional shape as to substantially fill the above described slots. Furthermore, the shape of the bars 18 and the walls 27 and 28 of the slots are curved in such a manner that the tooth core section 29, or that part of the laminations between the conductors 18 are substantially uniform in width throughout the length thereof. Thus the root portion 30 of each tooth is not weakened. The bars or conductors 18 may therefore be positioned within the slots by pushing the conductors therein from the end of the rotor and each bar or conductor will be prevented from moving radially outward under the influence of the centrifugal force by the converging walls of each slot and particularly the wall 27 since the centrifugal component will cause each bar to be urged against that wall.

Such a rotor as illustrated in Figure 2 is adapted to be rotated in a clockwise direction as indicated by the arrow 31 to cause cooling air to be circulated through the windings and other elements of the motor. In other words, the ends of the bars 18, curved in cross-section, extending beyond the faces 19 and 21 of the rotor provide fan blades so that when the secondary member is rotated the ends of bars 18 will draw air through the openings 23 and 24 and propel such cooling medium into contact with other elements of the motor. The circulated air after entering the annular openings 23 and 24 follows various paths as indicated by the arrows associated with Figure 1. For example, a portion of the air is projected through that portion of the windings 13 extending beyond the laminations 14. Other parts of the cooling medium are caused by the fan to move along the air gap and travel through the passages 16 and 17 to thus ventilate the central portions of the windings 13 and the stator core structure. Such circulation of the ventilating air of course engages the secondary windings or the ends of the bars 18 and the rings 22 to thus carry away any heat generated in these parts. In this connection it is to be noted that the bars 18 have a relatively large surface area. The large surfaces of the bars 18 thus provide a fan at each end of the rotor whereby a volume of air is propelled through the motor by reason of the large surface blade-like bars to provide a forced volume of air which is greater than that obtained in known structures of this type.

The cross-sectional shape of the bars 18 as hereinabove described also provides the motor with a characteristic increased starting torque. That is to say, the uniform core section between the slots provides a good path for the lines of flux set up by the current induced in the secondary windings. This feature is particularly advantageous in small motors since saturation of the rotor iron near the periphery of the small diameter rotor is avoided. Furthermore, the uniform shape of the tooth core section 29 provides a uniform path for the magnetic lines of force near the periphery of the rotor.

Although certain preferred embodiments of the invention have been described it is apparent that modifications may be made therein by those skilled in the art. Such modifications may be made without departing from the spirit and scope of the present invention as set forth in the appended claims.

I claim as my invention:

1. In a motor, a stator, a shaft having a rotor mounted thereon for supporting the rotor within said stator, a plurality of bars having elongated cross-sections wherein the base of the bars is of a given width and the top is of less width, the side faces of the bars being curved and converging towards each other at the top, said bars being arranged on said rotor with the major axis of each bar angularly displaced with respect to the radii of said rotor, said bar extending beyond one end of said rotor, an electrical connection for said bars comprising a ring attached to the ends of said bars to provide an annular opening around said shaft through which air is drawn by the extensions of said bars acting as a fan when said rotor is gyrated in a direction opposite to said angular displacement of said bars.

2. In a motor, a rotor having slots formed in a circumferentially spaced relation around the periphery thereof, said slots having a relatively wide base, a side wall extending outwardly to the periphery of the rotor in a curved fashion, the other wall extending outwardly to the periphery of the rotor in a curved fashion differing from said first mentioned wall, said curved walls converging toward each other as they approach periphery of the rotor, conductors substantially filling said slots, whereby said conductors are prevented from moving radially outward when said rotor is gyrated.

3. In a motor, a rotor having elongated slots extending endwise into the rotor from the periphery thereof, said slots having curved side walls which converge towards each other in proceedings from the base of the slots towards the periphery of the rotor, said curved walls being so constructed and arranged as to provide a tooth core section between each slot which is equal in width at the base and top thereof, conductors substantially filling said slots, so that current passing said elongated curved conductor will be provided with a flux path formed of said teeth having uniform sectional areas, and said conductors extending beyond the ends of the rotor which act as fan blades when the rotor revolves.

WILLIAM R. GORHAM.